(12) United States Patent
Zarem

(10) Patent No.: US 8,543,326 B2
(45) Date of Patent: Sep. 24, 2013

(54) NAVIGATION SYSTEM WITH ORIENTATION MECHANISM AND METHOD OF OPERATION THEREOF

(75) Inventor: Matthew Zarem, Sausalito, CA (US)

(73) Assignee: Telenav, Inc., Sunnyvale, CA (US)

( * ) Notice: Subject to any disclaimer, the term of this patent is extended or adjusted under 35 U.S.C. 154(b) by 553 days.

(21) Appl. No.: 12/569,602

(22) Filed: Sep. 29, 2009

(65) Prior Publication Data

US 2011/0077849 A1    Mar. 31, 2011

(51) Int. Cl.
*G01C 21/36* (2006.01)

(52) U.S. Cl.
USPC .......................... 701/400; 340/988

(58) Field of Classification Search
CPC ....................................... G01C 21/36
USPC ...................... 701/400; 340/988; 455/456.5
See application file for complete search history.

(56) References Cited

U.S. PATENT DOCUMENTS

| | | | |
|---|---|---|---|
| 6,144,318 A | 11/2000 | Hayashi et al. | |
| 6,339,746 B1 | 1/2002 | Sugiyama et al. | |
| 6,480,786 B2 | 11/2002 | Watanabe et al. | |
| 6,697,734 B1 | 2/2004 | Suomela | |
| 6,700,504 B1* | 3/2004 | Aslandogan et al. | 340/901 |
| 6,728,635 B2 | 4/2004 | Hamada et al. | |
| 6,766,245 B2 | 7/2004 | Padmanabhan | |
| 6,813,558 B1* | 11/2004 | Lapstun et al. | 701/533 |
| 6,820,005 B2 | 11/2004 | Matsuda et al. | |
| 6,826,474 B2* | 11/2004 | Miyahara et al. | 701/533 |
| 7,266,447 B2* | 9/2007 | Bauer et al. | 701/423 |
| 7,671,764 B2* | 3/2010 | Uyeki et al. | 340/995.13 |
| 7,689,350 B2* | 3/2010 | Lapstun et al. | 701/425 |
| 7,824,521 B2* | 11/2010 | van Heiningen et al. | 162/43 |
| 7,898,438 B2* | 3/2011 | Brosius, III | 340/995.27 |
| 8,265,864 B1* | 9/2012 | Kaufman et al. | 701/408 |
| 2006/0025923 A1* | 2/2006 | Dotan et al. | 701/207 |
| 2008/0046170 A1 | 2/2008 | DeGrazia | |
| 2008/0052000 A1 | 2/2008 | Furstenberg | |
| 2008/0052105 A1 | 2/2008 | Jin et al. | |
| 2008/0109164 A1 | 5/2008 | Matsunaga et al. | |
| 2008/0180282 A1* | 7/2008 | Brosius | 340/995.27 |
| 2008/0285811 A1* | 11/2008 | Lapstun et al. | 382/113 |
| 2009/0171558 A1* | 7/2009 | Davis et al. | 701/200 |
| 2009/0187339 A1* | 7/2009 | DeVries et al. | 701/208 |
| 2010/0023249 A1* | 1/2010 | Mays et al. | 701/200 |
| 2011/0098920 A1* | 4/2011 | Chuang et al. | 701/202 |

OTHER PUBLICATIONS

International Search Report for Application No. PCT/US2010/050601 dated Nov. 10, 2010.

* cited by examiner

*Primary Examiner* — Tuan C. To

(74) *Attorney, Agent, or Firm* — IP Investment Law Group

(57) ABSTRACT

A method of operation of a navigation system includes: calculating a travel route from an origin location to a destination location; and identifying an orientation location along the travel route for assisting in an initial orientation from the origin location for displaying on a device.

17 Claims, 7 Drawing Sheets

NAVIGATION SYSTEM WITH ORIENTATION MECHANISM AND METHOD OF OPERATION THEREOF

TECHNICAL FIELD

The present invention relates generally to a navigation system, and more particularly to a system for a navigation system with orientation mechanism.

BACKGROUND ART

Modern portable consumer and industrial electronics provide increasing levels of functionality to support modern life including location-based information services. This is especially true for client devices such as navigation systems, cellular phones, portable digital assistants, and multifunction devices.

As users adopt mobile location-based service devices, new and old, users begin to take advantage of this new device space. There are many solutions to take advantage of this new device opportunity. One existing approach is to use location information to provide navigation services, such as a global positioning service (GPS) navigation system for a mobile device.

Navigation system and service providers are continually making improvement in the user's experience in order to be competitive. In navigation services, demand for better usability using recognition is increasingly important.

In location based application services, users are often not geographically oriented with their physical surroundings when they initiate a GPS-assisted navigation session and want to find and navigate-to a nearby point of interest or address. As a result, the information returned by an application service designed to assist in navigation is confusing and often unusable.

In response to consumer demand, navigation systems are providing ever-increasing amounts of information requiring these systems to improve usability, performance, and accuracy. This information includes map data, business data, local weather, and local driving conditions. The demand for more information and the need to provide user-friendly experience, low latency, and accuracy continue to challenge the providers of navigation systems.

Thus, a need remains for a navigation system to provide information with improvement in usability, performance, and accuracy. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: calculating a travel route from an origin location to a destination location; and identifying an orientation location along the travel route for assisting in an initial orientation from the origin location for displaying on a device.

The present invention provides a navigation system including: a location unit for determining an origin location; a route generation module, coupled to the location unit, for calculating a travel route from the origin location to a destination location; and an orientation module, coupled to the route generation module, for identifying an orientation location along the travel route for assisting in an initial orientation from the origin location for displaying on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
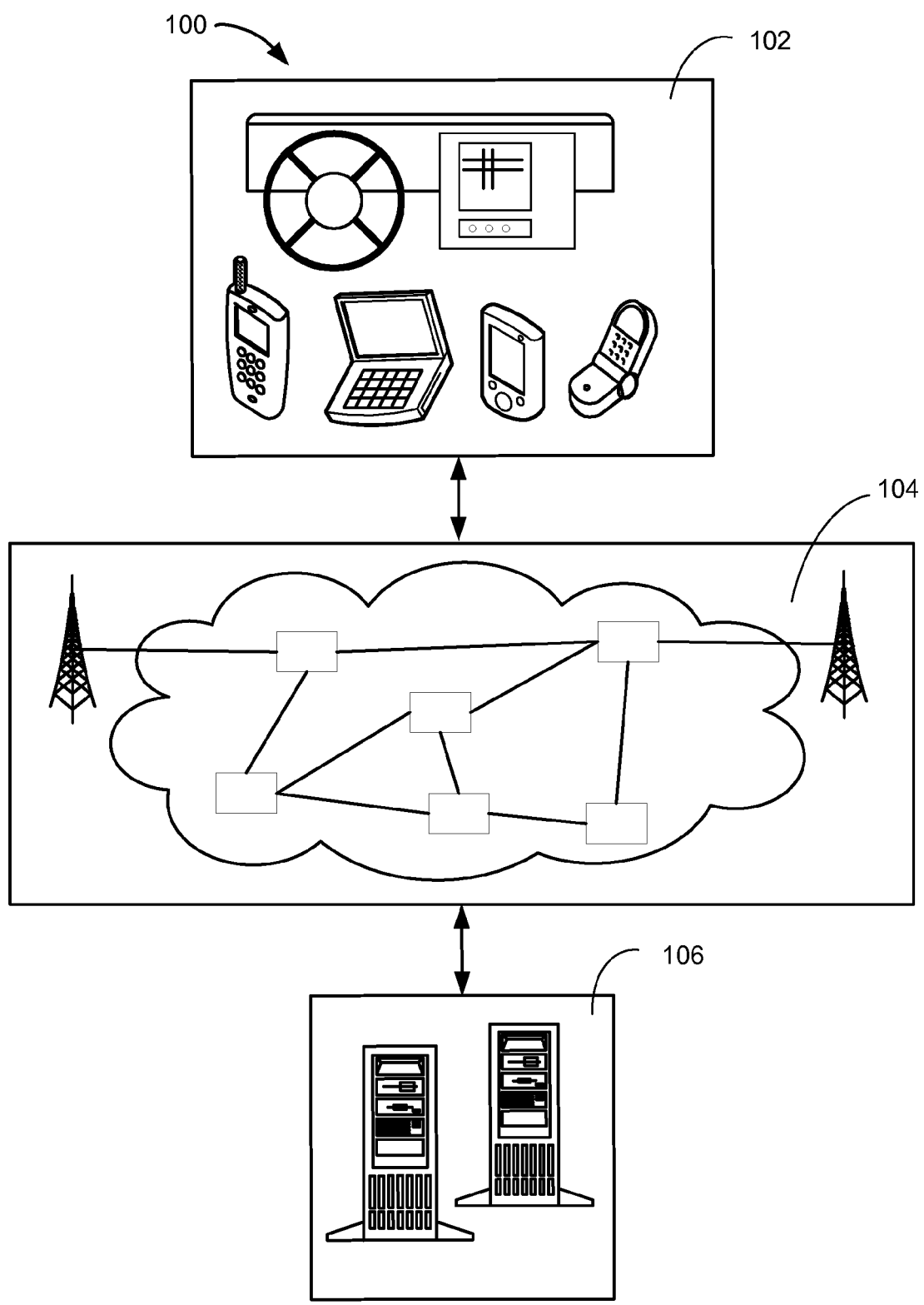
FIG. 1 is a navigation system with orientation mechanism in a first embodiment of the present invention.

The following embodiments are described in sufficient detail to enable those skilled in the art to make and use the invention. It is to be understood that other embodiments would be evident based on the present disclosure, and that system, process, or mechanical changes can be made without departing from the scope of the present invention.

In the following description, numerous specific details are given to provide a thorough understanding of the invention. However, it can be apparent that the invention can be practiced without these specific details. In order to avoid obscuring the present invention, some well-known circuits, system configurations, and process locations are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

The same or similar numbers are used in all the drawing FIGs. to relate to the same elements. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X,Y), where X and Y are two ordinates that define the geographic location, i.e., a position of a user.

In an alternative embodiment, navigation information is presented by longitude and latitude related information. In a further embodiment of the present invention, the navigation information also includes a velocity element comprising a speed component and a heading component.

The term "navigation routing information" referred to herein is defined as the routing information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with orientation mechanism in a first embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
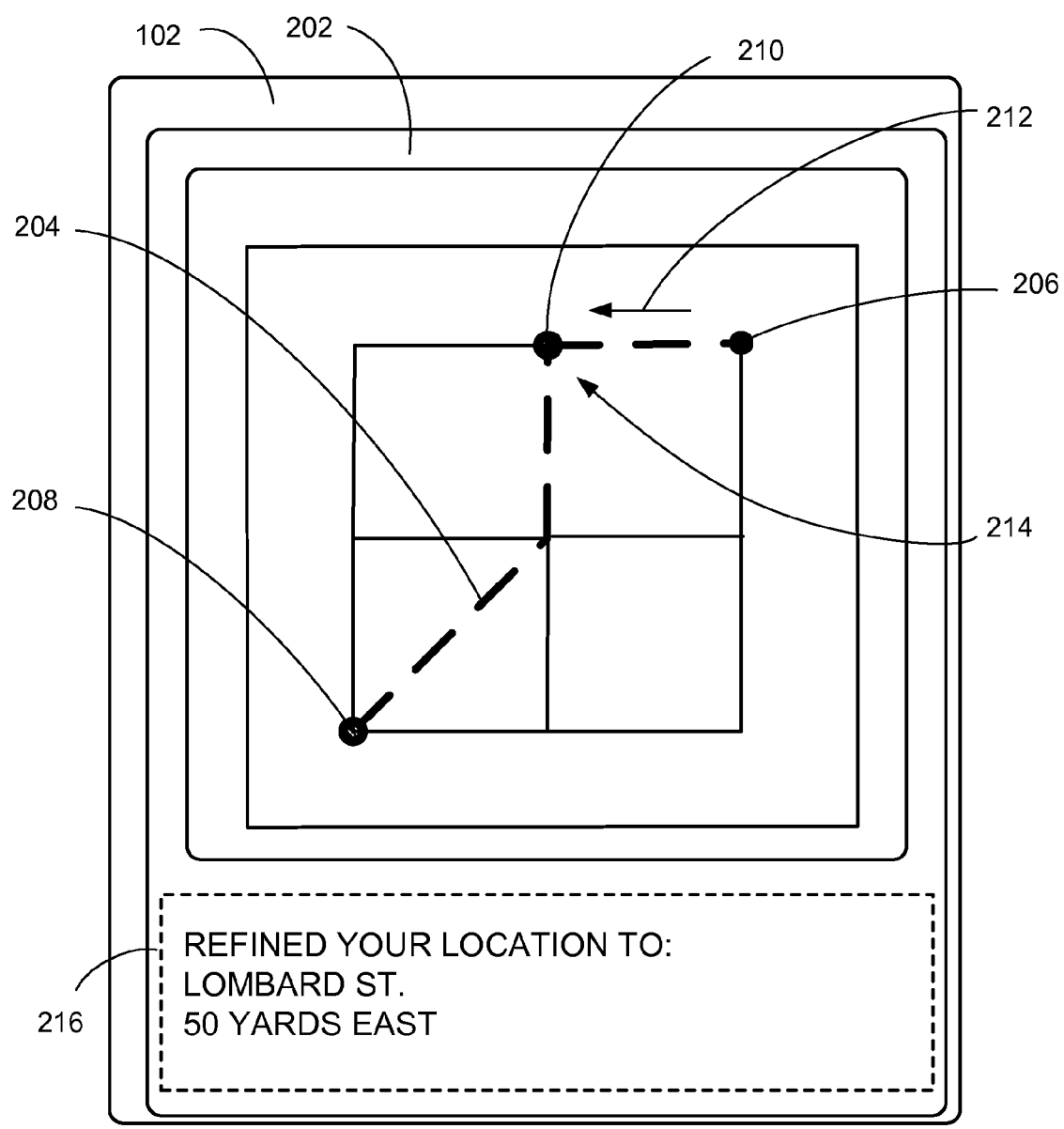
FIG. 2 is a display interface of the first device.

Referring now to FIG. 2, therein is shown a display interface 202 of the first device 102. The display interface 202 can present a travel route 204 from an origin location 206 to a destination location 208. The origin location 206 can be the initial location of a user. The destination location 208 can be the location the user desires to reach. The travel route 204 can be a route from the origin location 206 to the destination location 208.

An orientation location 210 can be along the travel route 204 and between the origin location 206 and the destination location 208. The orientation location 210 is not the destination location 208 or the origin location 206. The orientation location 210 can be used to help orient a user unfamiliar with the origin location 206, the destination location 208, the travel route 204, or a combination thereof.

The orientation location 210 can provide an initial orientation 212 from the origin location 206 for the user to traverse the travel route 204 to the destination location 208. For example, the initial orientation 212 can be represented by a direction icon or a visual cue on the display interface 202 directing the user from the origin location 206 to the orientation location 210.

The orientation location 210 can represent prominent locations 214. The prominent locations 214 can be locations that are recognizable to the user, such as a street, an intersection, a landmark, or a point of interest.

The display interface 202 can include an orientation instruction 216 to help a user navigate from the origin location 206 to the orientation location 210. The orientation instruction 216 can include information to help the user identify the orientation location 210 and traverse the travel route 204 from the origin location 206 to the orientation location 210. For example, the orientation instruction 216 can be "Refined your location to: Lombard St. (50 yards East)."

Figure 3:
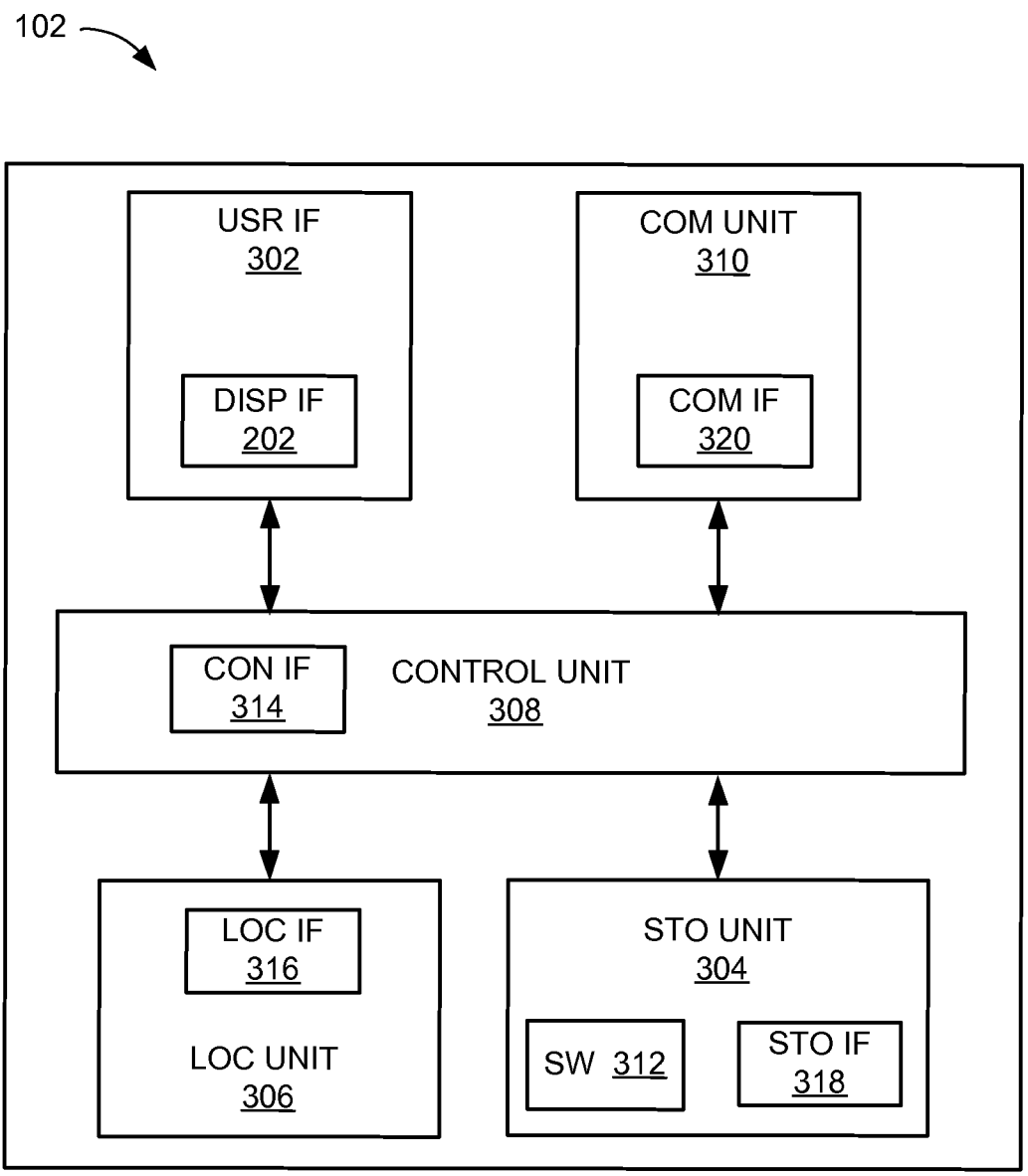
FIG. 3 is an exemplary block diagram of the first device.

Referring now to FIG. 3, therein is shown an exemplary block diagram of the first device 102. The first device 102 can include a user interface 302, a storage unit 304, a location unit 306, a control unit 308, and a communication unit 310.

The user interface 302 allows a user (not shown) to interface and interact with the first device 102. The user interface 302 can include an input device and an output device. Examples of the input device of the user interface 302 can include a keypad, a touchpad, soft-keys, a keyboard, a microphone, or any combination thereof to provide data and communication inputs. Examples of the output device of the user interface 302 can include the display interface 202. The display interface 202 can include a display, a projector, a video screen, a speaker, or any combination thereof.

The control unit 308 can execute a software 312 to provide the intelligence of the navigation system 100. The control unit 308 can operate the user interface 302 to display information generated by the navigation system 100. The control unit 308 can also execute the software 312 for the other functions of the navigation system 100, including receiving location information from the location unit 306. The control unit 308 can further execute the software 312 for interaction with the communication path 104 of FIG. 1 via the communication unit 310.

The control unit 308 can be implemented in a number of different manners. For example, the control unit 308 can be a processor, an embedded processor, a microprocessor, a hardware control logic, a hardware finite state machine (FSM), a digital signal processor (DSP), or a combination thereof.

The control unit 308 can include a controller interface 314. The controller interface 314 can be used for communication between the control unit 308 and other functional units in the first device 102. The controller interface 314 can also be used for communication that is external to the first device 102.

The controller interface 314 can receive information from the other functional units or from external sources, or can transmit information to the other functional units or to external destinations. The external sources and the external destinations refer to sources and destinations external to the first device 102.

The controller interface 314 can be implemented in different ways and can include different implementations depending on which functional units or external units are being interfaced with the controller interface 314. For example, the controller interface 314 can be implemented with a pressure sensor, an inertial sensor, a microelectromechanical system (MEMS), optical circuitry, waveguides, wireless circuitry, wireline circuitry, or a combination thereof.

The location unit 306 can generate location information, current heading, and current speed of the first device 102, as examples. The location unit 306 can be implemented in many ways. For example, the location unit 306 can function as at least a part of a global positioning system (GPS), an inertial navigation system, a cellular-tower location system, a pressure location system, or any combination thereof.

The location unit 306 can include a location interface 316. The location interface 316 can be used for communication between the location unit 306 and other functional units in the first device 102. The location interface 316 can also be used for communication that is external to the first device 102.

The location interface 316 can receive information from the other functional units or from external sources, or can transmit information to the other functional units or to external destinations. The external sources and the external destinations refer to sources and destinations external to the first device 102.

The location interface 316 can include different implementations depending on which functional units or external units are being interfaced with the location unit 306. The location interface 316 can be implemented with technologies and techniques similar to the implementation of the controller interface 314.

The storage unit 304 can store the software 312. The storage unit 304 can also store the relevant information, such as advertisements, points of interest (POI), navigation routing entries, or any combination thereof.

The storage unit 304 can be a volatile memory, a nonvolatile memory, an internal memory, an external memory, or a combination thereof. For example, the storage unit 304 can be a nonvolatile storage such as non-volatile random access memory (NVRAM), Flash memory, disk storage, or a volatile storage such as static random access memory (SRAM).

The storage unit 304 can include a storage interface 318. The storage interface 318 can be used for communication between the location unit 306 and other functional units in the first device 102. The storage interface 318 can also be used for communication that is external to the first device 102.

The storage interface 318 can receive information from the other functional units or from external sources, or can transmit information to the other functional units or to external destinations. The external sources and the external destinations refer to sources and destinations external to the first device 102.

The storage interface 318 can include different implementations depending on which functional units or external units are being interfaced with the storage unit 304. The storage interface 318 can be implemented with technologies and techniques similar to the implementation of the controller interface 314.

The communication unit 310 can enable external communication to and from the first device 102. For example, the communication unit 310 can permit the first device 102 to communicate with the second device 106 of FIG. 1, an attachment, such as a peripheral device or a computer desktop, and the communication path 104.

The communication unit 310 can also function as a communication hub allowing the first device 102 to function as part of the communication path 104 and not limited to be an end point or terminal unit to the communication path 104. The communication unit 310 can include active and passive components, such as microelectronics or an antenna, for interaction with the communication path 104.

The communication unit 310 can include a communication interface 320. The communication interface 320 can be used for communication between the communication unit 310 and other functional units in the first device 102. The communication interface 320 can receive information from the other functional units or can transmit information to the other functional units.

The communication interface 320 can include different implementations depending on which functional units are being interfaced with the communication unit 310. The communication interface 320 can be implemented with technologies and techniques similar to the implementation of the controller interface 314.

For illustrative purposes, the navigation system 100 is shown with the partition having the user interface 302, the storage unit 304, the location unit 306, the control unit 308, and the communication unit 310 although it is understood that the navigation system 100 can have a different partition. For example, the software 312 can be partitioned differently such that some or all of its function can be in the control unit 308, the location unit 306, and the communication unit 310. Also, the first device 102 can include other functional units not shown in FIG. 3 for clarity.

The functional units in the first device 102 can work individually and independently of the other functional units. The first device 102 can work individually and independently from the second device 106 and the communication path 104.

Figure 4:
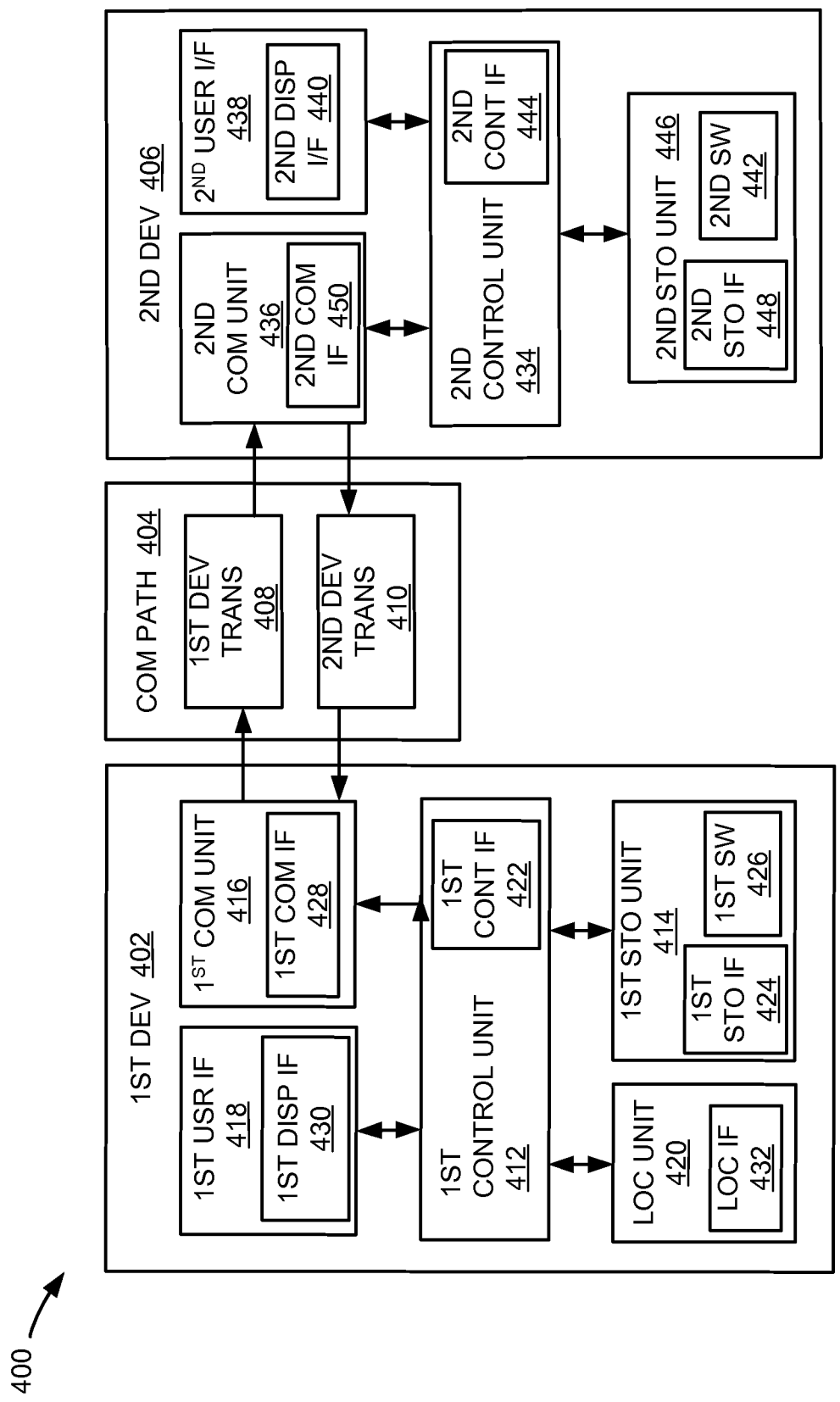
FIG. 4 is an exemplary block diagram of a navigation system with orientation mechanism in a second embodiment of the present invention.

Referring now to FIG. 4, therein is shown an exemplary block diagram of a navigation system 400 with orientation mechanism in a second embodiment of the present invention. The navigation system 400 can include a first device 402, a communication path 404, and a second device 406.

The first device 402 can communicate with the second device 406 over the communication path 404. For example, the first device 402, the communication path 404, and the second device 406 can be the first device 102 of FIG. 1, the communication path 104 of FIG. 1, and the second device 106 of FIG. 1, respectively. The screen shot shown on the display interface 202 described in FIG. 2 can represent the screen shot for the navigation system 400.

The first device 402 can send information in a first device transmission 408 over the communication path 404 to the second device 406. The second device 406 can send information in a second device transmission 410 over the communication path 404 to the first device 402.

For illustrative purposes, the navigation system 400 is shown with the first device 402 as a client device, although it is understood that the navigation system 400 can have the first device 402 as a different type of device. For example, the first device 402 can be a server.

Also for illustrative purposes, the navigation system 400 is shown with the second device 406 as a server, although it is understood that the navigation system 400 can have the second device 406 as a different type of device. For example, the second device 406 can be a client device.

For brevity of description in this embodiment of the present invention, the first device 402 will be described as a client device and the second device 406 will be described as a server device. The present invention is not limited to this selection for the type of devices. The selection is an example of the present invention.

The first device 402 can include a first control unit 412, a first storage unit 414, a first communication unit 416, a first user interface 418, and a location unit 420. The first device 402 can be similarly described by the first device 102.

The first control unit 412 can include a first control interface 422. The first control unit 412 and the first control interface 422 can be similarly described as the control unit 308 of FIG. 3 and the controller interface 314 of FIG. 3, respectively.

The first storage unit 414 can include a first storage interface 424. The first storage unit 414 and the first storage interface 424 can be similarly described as the storage unit 304 of FIG. 3 and the storage interface 318 of FIG. 3, respectively. A first software 426 can be stored in the first storage unit 414.

The first communication unit 416 can include a first communication interface 428. The first communication unit 416 and the first communication interface 428 can be similarly described as the communication unit 310 of FIG. 3 and the communication interface 320 of FIG. 3, respectively.

The first user interface 418 can include a first display interface 430. The first user interface 418 and the first display interface 430 can be similarly described as the user interface 302 of FIG. 3 and the display interface 202 of FIG. 3, respectively.

The location unit 420 can include a location interface 432. The location unit 420 and the location interface 432 can be similarly described as the location unit 306 of FIG. 3 and the location interface 316 of FIG. 3, respectively.

The performance, architectures, and type of technologies can also differ between the first device 102 and the first device 402. For example, the first device 102 can function as a single device embodiment of the present invention and can have a higher performance than the first device 402. The first device 402 can be similarly optimized for a multiple device embodiment of the present invention.

For example, the first device 102 can have a higher performance with increased processing power in the control unit 308 compared to the first control unit 412. The storage unit 304 can provide higher storage capacity and access time compared to the first storage unit 414.

Also for example, the first device 402 can be optimized to provide increased communication performance in the first communication unit 416 compared to the communication unit 310. The first storage unit 414 can be sized smaller compared to the storage unit 304. The first software 426 can be smaller than the software 312 of FIG. 3.

The second device 406 can be optimized for implementing the present invention in a multiple device embodiment with the first device 402. The second device 406 can provide the additional or higher performance processing power compared to the first device 402. The second device 406 can include a second control unit 434, a second communication unit 436, and a second user interface 438.

The second user interface 438 allows a user (not shown) to interface and interact with the second device 406. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the navigation system 400. The second software 442 can operate in conjunction with the first software 426. The second control unit 434 can provide additional performance compared to the first control unit 412 or the control unit 308.

The second control unit 434 can operate the second user interface 438 to display information. The second control unit 434 can also execute the second software 442 for the other functions of the navigation system 400, including operating the second communication unit 436 to communicate with the first device 402 over the communication path 404.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 406. The second controller interface 444 can also be used for communication that is external to the second device 406.

The second controller interface 444 can receive information from the other functional units or from external sources, or can transmit information to the other functional units or to external destinations. The external sources and the external destinations refer to sources and destinations external to the second device 406.

The second controller interface 444 can be implemented in different ways and can include different implementations depending on which functional units or external units are being interfaced with the second controller interface 444. For example, the second controller interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the relevant information, such as advertisements, points of interest (POI), navigation routing entries, or any combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the navigation system 400 is shown with the second storage unit 446 as a single hierarchy storage system, although it is understood that the navigation system 400 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as nonvolatile random access memory (NVRAM), Flash memory, disk storage, or a volatile storage such as static random access memory (SRAM).

The second storage unit 446 can include a second storage interface 448. The second storage interface 448 can be used for communication between the location unit 306 and other functional units in the second device 406. The second storage interface 448 can also be used for communication that is external to the second device 406.

The second storage interface 448 can receive information from the other functional units or from external sources, or can transmit information to the other functional units or to external destinations. The external sources and the external destinations refer to sources and destinations external to the second device 406.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the second device 406. For example, the second communication unit 436 can permit the second device 406 to communicate with the first device 402 over the communication path 404.

The second communication unit 436 can also function as a communication hub allowing the second device 406 to function as part of the communication path 404 and not limited to be an end point or terminal unit to the communication path 404. The second communication unit 436 can include active and passive components, such as microelectronics or an antenna, for interaction with the communication path 404.

The second communication unit 436 can include a second communication interface 450. The second communication interface 450 can be used for communication between the second communication unit 436 and other functional units in the second device 406. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication path 404 to send information to the second device 406 in the first device transmission 408. The second device 406 can receive information in the second communication unit 436 from the first device transmission 408 of the communication path 404.

The second communication unit 436 can couple with the communication path 404 to send information to the first device 402 in the second device transmission 410. The first device 402 can receive information in the first communication unit 416 from the second device transmission 410 of the communication path 404. The navigation system 400 can be executed by the first control unit 412, the second control unit 434, or a combination thereof.

For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 406 can include other functional units not shown in FIG. 4 for clarity.

The functional units in the first device 402 can work individually and independently of the other functional units. The first device 402 can work individually and independently from the second device 406 and the communication path 404.

The functional units in the second device 406 can work individually and independently of the other functional units. The second device 406 can work individually and independently from the first device 402 and the communication path 404.

For illustrative purposes, the navigation system 400 is described by operation of the first device 402 and the second device 406. It is understood that the first device 402 and the second device 406 can operate any of the modules and functions of the navigation system 400. For example, the first device 402 is described to operate the location unit 420, although it is understood that the second device 406 can also operate the location unit 420.

Figure 5:
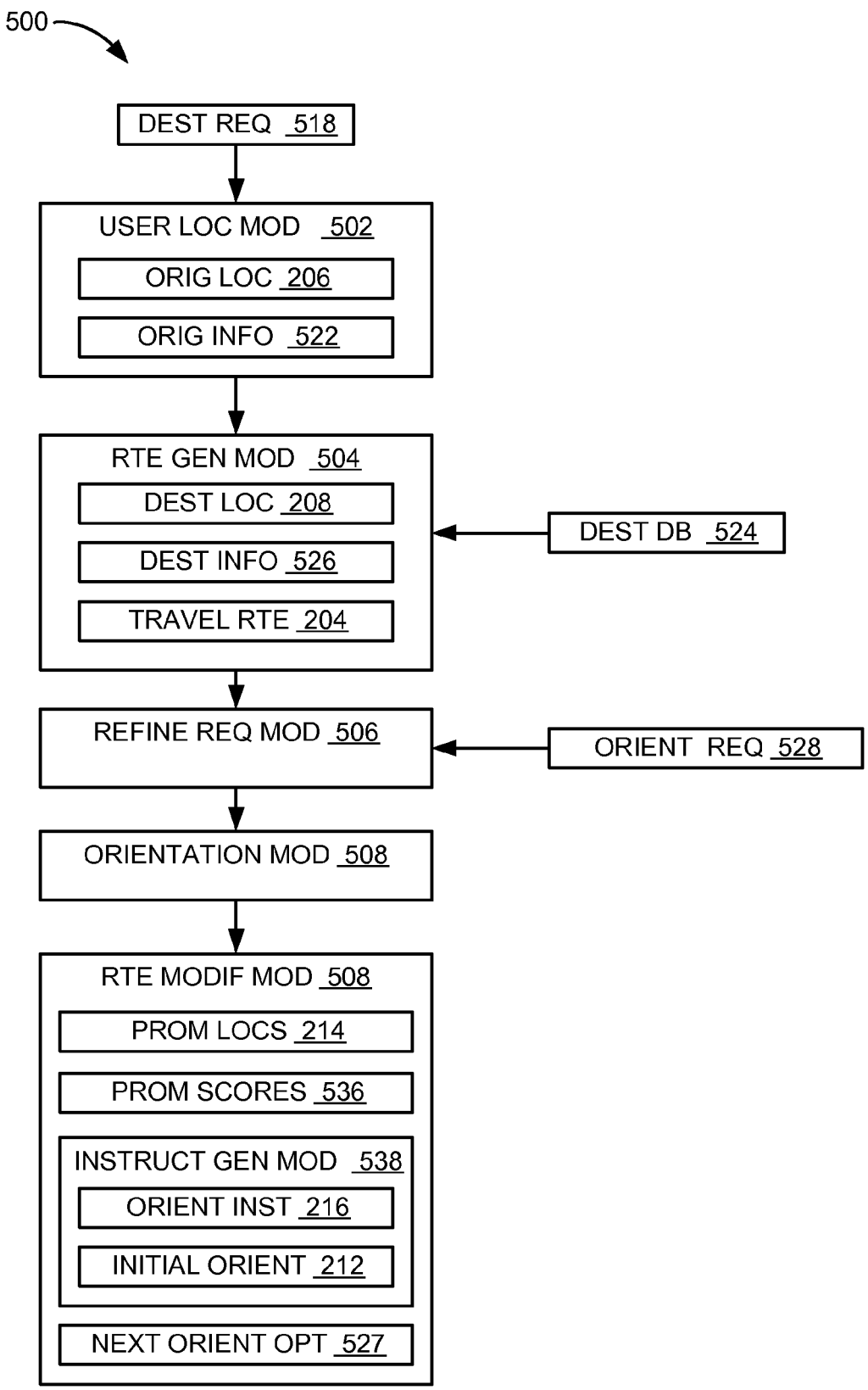
FIG. 5 is a navigation system with orientation mechanism in a third embodiment of the present invention.

Referring now to FIG. 5, therein is shown a navigation system 500 with orientation mechanism in a third embodiment of the present invention. The navigation system 500 can include functions for orienting a user along a route from an unfamiliar starting location to a desired destination by directing the user to an intermediate location. The intermediate location can be used to orient the user from the starting location. The intermediate location can be near the starting location, recognizable to the user, and along the route.

The navigation system 500 can receive a destination request 518, such as a request to locate a desired destination, a point of interest, or a category of interest. For example, the destination request 518 can be "find a Starbucks near me."

The destination request 518 can include a request to locate the destination location 208 of FIG. 2.

The navigation system 500 can include a user location module 502. The user location module 502 includes the function for determining the current location of the user. The user location module 502 can determine the origin location 206 of FIG. 2 as the current location of the user by utilizing the location unit 306 of FIG. 3 or the location unit 420 of FIG. 4.

For example, the user location module 502 can represent the origin location 206 as longitude and latitude coordinates or a street address. The user location module 502 can store the representation of the origin location 206 as an origin information 522. The origin information 522 can include longitude and latitude coordinates or the street address of the origin location 206.

The navigation system 500 can include a route generation module 504. The route generation module 504 includes the functions for determining the location of a destination and generating a route from the origin location 206 of the user to the destination. The route generation module 504 can receive the origin information 522 and optionally receive the destination request 518.

The route generation module 504 can identify the destination location 208 that from the destination request 518. The route generation module 504 can search a destination database 524 that contains information of locations that can match the destination request 518. Once the route generation module 504 has identified the destination location 208, the route generation module 504 can extract information from the destination database 524, such as geographic position, longitude and latitude coordinates, or the street address. The route generation module 504 can store a representation of the destination location 208 in destination information 526, such as the coordinates or the street address of the destination location 208.

The route generation module 504 can calculate the travel route 204 from the origin location 206 to the destination location 208. The route generation module 504 can optionally use the origin information 522 and the destination information 526 for generating the travel route 204.

The route generation module 504 can display the travel route 204, the origin location 206, the origin information 522, the destination location 208, the destination information 526, or a combination thereof on the display interface 202 of FIG. 2. For example, the navigation system 500 can present the origin location 206 on the display interface 202 as "user found at 10 Main St. Sunnyvale, Calif." As a further example, the navigation system 500 can present the travel route 204 depicted in FIG. 2.

The navigation system 500 can include a refinement request module 506. The refinement request module 506 can be used to refine the information sent to the user by the route generation module 504. The user can elect the refinement because the information displayed from the route generation module 504 may be unfamiliar to the user. For example, the refinement request module 506 can receive an orientation request 528 from the user to search for locations to orient the user along the travel route 204 from the origin location 206 that is unfamiliar to the user.

The orientation request 528 can be a command to direct the navigation system 500 to search for and identify the orientation location 210 of FIG. 2. For example, the refinement request module 506 can prompt the user whether the user would like to refine the origin location 206 on the display interface 202. As another example, the user can set an option for the navigation system 500 to automatically refine the origin location 206.

The navigation system 500 can include an orientation module 508. The orientation module 508 has the functions for searching for locations, landmarks, or points of interest around the user's starting location that are prominent and recognizable to the user. A location that is prominent and recognizable can represent a location that is easily or quickly recognized and viewed from the street level. For example, prominent and recognizable locations can include landmarks or points of interest that stand out from the surrounding environment, are not obscured by other buildings or structures, or are not offset from the road or route.

The orientation module 508 can search and identify one or more locations as the orientation location 210 that are prominent and recognizable to the user for orienting the user from the origin location 206. For example, the orientation module 508 can identify the orientation location 210 along the travel route 204 of FIG. 2 for assisting in the initial orientation 212 of FIG. 2 from the origin location 206. The orientation location 210 can be different from the destination location 208 of FIG. 2.

The orientation module 508 can rank the locations based on their degree of recognizability to the user, and generating navigation instructions based on the identified locations to orient the user. The orientation module 508 will be discussed in more detail later.

The orientation module 508 can select the prominent locations 214 and prominence scores 536. The prominence scores 536 can be a value that represents the likelihood that a location can be recognizable to a person from street level, road level, or trail level, as examples. As a further example, the orientation module 508 can select the prominent locations 214 along the travel route 204 that is closest to the origin location. The higher the value, the more prominent and recognizable a location is scored.

The navigation system 500 can include a route modification module 510. The route modification module 510 can modify the travel route 204 by incorporating changes from the orientation module 508. The route modification module 510 can also modify the orientation location 210 with the prominent locations 214 as the orientation location 210.

The route modification module 510 can select the prominent locations 214 as the orientation location 210 based on the prominence scores 536. The route modification module 510 can select the prominent locations 214 with the highest value of the prominence scores 536 as possible selections for the orientation location 210.

The route modification module 510 can display the travel route 204 with the orientation location 210, the orientation instruction 216 of FIG. 2, and the initial orientation 212 on the display interface 202. The route modification module 510 can optionally modify the travel route 204 to include the orientation location 210.

The route modification module 510 can include an instruction generation module 538 for generating instructions to help a user navigate from the origin location 206 to the orientation location 210. The instruction generation module 538 can generate the orientation instruction 216 and the initial orientation 212 for display on the display interface 202 corresponding to the prominent locations 214 with the highest value of the prominence scores 536.

The route modification module 510 can optionally allow the user to view the prominent locations 214 with the next highest value for the prominence scores 536. The route modification module 510 can have a next orientation option 537, which can be a command to select the prominent locations 214 with the next highest value of the prominence scores 536. For example, if the user does not prefer the orientation location 210 with the highest value of the prominence scores 536, the user can use the next orientation option 537 to select one of the prominent locations 214 with the next highest values of the prominence scores 536 for the orientation location 210.

Figure 6:
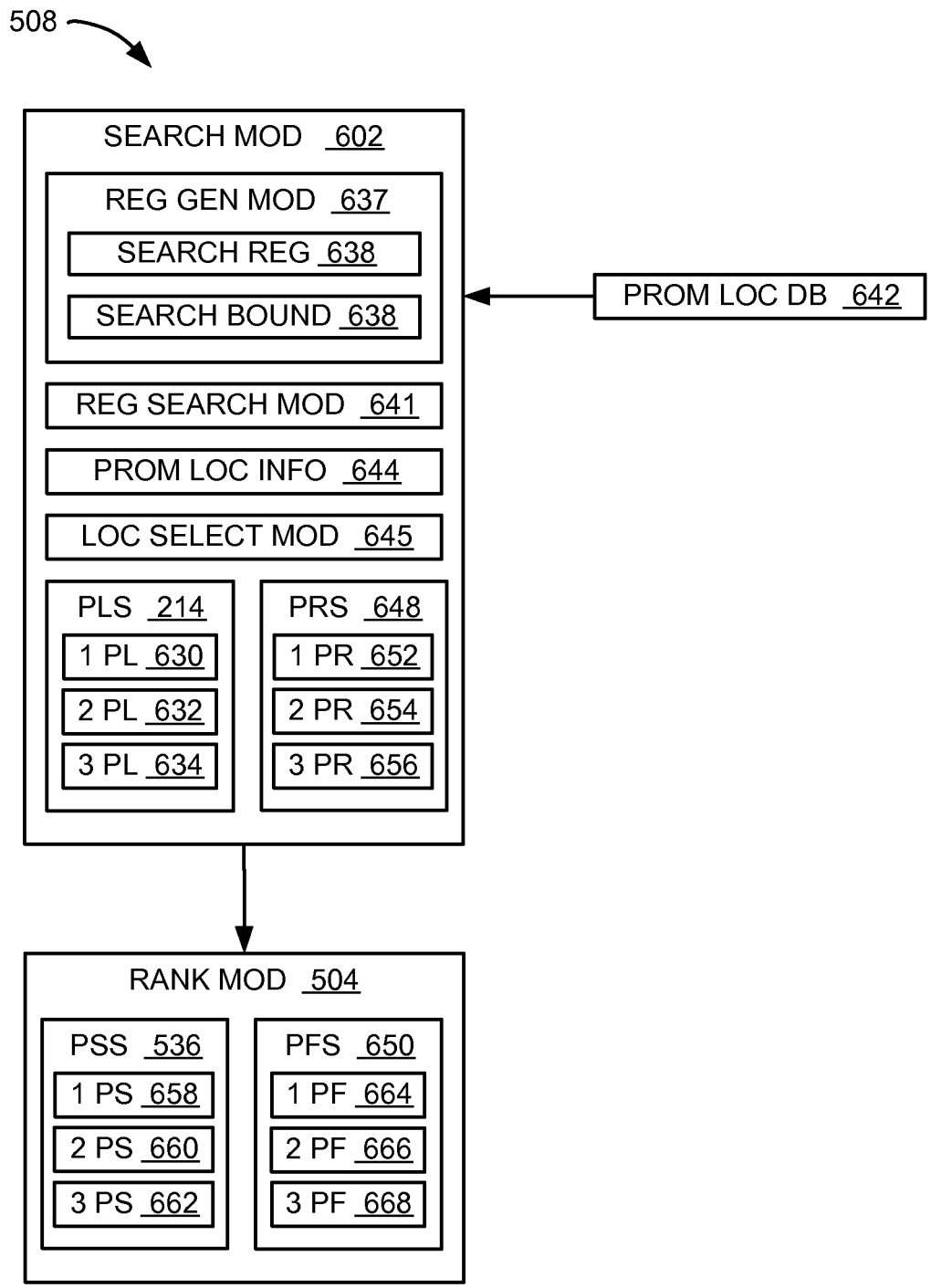
FIG. 6 is a detailed view of the orientation module.

Referring now to FIG. 6, therein is shown a detailed view of the orientation module 508. The orientation module 508 can include a search module 602. The search module 602 can have the function for searching for locations, landmarks, or points of interest around the user's starting location that are prominent and recognizable to the user. The search module 602 can be initiated by receiving the orientation request 528 of FIG. 5.

The search module 602 can include a region generation module 637 for generate a search region 638 by setting a search boundary 640 around the origin location 206. The search boundary 640 can represent an outer limit of the search for the prominent locations 214. The search boundary 640 can be set automatically by the search module 602 or manually set by the user.

The search boundary 640 can be a pre-defined or variable. For example, the search boundary 640 can be pre-defined as a fixed distance from the origin location 206 or variable depending on the environment of the user. As a further example, the search boundary 640 can be set at one or two blocks away from the origin location 206 in an urban city area or two miles away from the in a rural area.

The search module 602 can include a region search module 641 for searching for the prominent locations 214 in the search region 638. The prominent locations 214 can include a first prominent location 630, a second prominent location 632, and a third prominent location 634. The first prominent location 630, the second prominent location 632, and the third prominent location 634 can be unique locations along the travel route 204. For example, the first prominent location 630 can represent a gas station, the second prominent location 632 can represent an intersection, and the third prominent location 634 can represent a restaurant.

For illustrative purposes, the navigation system 500 is shown with the prominent locations 214 having the first prominent location 630, the second prominent location 632 and the third prominent location 634, although it is understood that the navigation system 500 can have a different number and types of the prominent locations 214. For example, the prominent locations 214 can include more or less than three examples of the prominent locations 214. Also, the prominent locations 214 can include museums, parks, government buildings, or sports arenas.

The region search module 641 can search for the prominent locations 214 in the search region 638. For example, the region search module 641 can search for the first prominent location 630, the second prominent location 632, and the third prominent location 634 within the search boundary 640. The region search module 641 can search a prominent location database 642 that contains prominent location information 644, such as physical features, geographic coordinates, or other inherent characteristics of the prominent locations 214.

The region search module 641 can narrow or broaden the search region 638. For example, if the first prominent location 630 is within the search region 638, the search region 638 can be broaden to find the second prominent location 632, and the third prominent location 634.

The search module 602 can include a location selection module 645 for selecting the prominent locations 214. The location selection module 645 can select the first prominent location 630, the second prominent location 632, and the third prominent location 634 in the prominent location database 642 that are within the search region 638. For example, the location selection module 645 can select the first prominent location 630, the second prominent location 632, and the third prominent location 634 based the inherent characteristics of the prominent locations 214 with the prominent location information 644.

The search module 602 can determine prominence ratings 648 that can be used for calculating the prominence scores 536 of FIG. 5. The prominence ratings 648 can represent a value using the prominent location information 644 including inherent characteristics for the first prominent location 630, the second prominent location 632, and the third prominent location 634. The inherent characteristics can include visibility from the travel route 204, distinctive physical features, proximity to the origin location 206, and location type, such as a street, an intersection, a structure, or a combination thereof.

The prominence ratings 648 can include a first prominence rating 652, a second prominence rating 654, and a third prominence rating 656. The first prominence rating 652 can correspond to the first prominent location 630. The second prominence rating 654 can correspond to the second prominent location 632. The third prominence rating 656 can correspond to the third prominent location 634.

The value of the prominence ratings 648 can be higher for the prominent locations 214 that can improve navigation for the user. For example, the first prominent location 630 can be closer to the origin location 206 than the second prominent location 632, therefore the first prominence rating 652 can higher than the second prominence rating 654. As another example, a higher value of the prominence ratings 648 can represent the prominent locations 214 can be a well known location to the user of the navigation system 500, to the general public, or a combination thereof.

The orientation module 508 can also include a ranking module 604 coupled to the search module 602. The ranking module 604 can compare the characteristics of a location and assigning a location ranking based on the comparison. The ranking module 604 can receive the prominent locations 214 and the prominence ratings 648 from the search module 602. The ranking module 604 can assign the prominence scores 536 to the first prominent location 630, the second prominent location 632, and the third prominent location 634.

The prominence scores 536 can include a first prominence score 658, a second prominence score 660, and a third prominence score 662 for the first prominent location 630, the second prominent location 632, and the third prominent location 634, respectively. The first prominence score 658, the second prominence score 660, and the third prominence score 662 can represent potentially how helpful each of these locations can be to orient a user from the origin location 206 to the destination location 208 along the travel route 204.

The ranking module 604 can rank the prominent locations 214 based on the prominence scores 536. The ranking module 604 can compare the value of the prominence scores 536 and rank the prominence scores 536 in descending value. The prominent locations 214 can be ranked according to the corresponding rank of the prominence scores 536. For example, if the first prominence score 658 is ranked above the second prominence score 660, then the first prominent location 630 will be ranked above the second prominent location 632.

The prominence scores 536 can be determined by multiplying the prominence ratings 648 by prominence factors 650. The prominence factors 650 can be a multiplier used by the ranking module 604 to calculate the prominence scores 536 for each of the prominent locations 214.

The prominence factors 650 can have a different value based on user preference. For example, the prominence factors 650 for the user's favorite type of the prominent locations 214, such as a gas station or restaurant, can be higher than that of a street or an intersection.

The prominence factors 650 can include a first prominence factor 664, a second prominence factor 666, and a third prominence factor 668. The first prominence factor 664 can correspond to the first prominent location 630. The second prominence factor 666 can correspond to the second prominent location 632. The third prominence factor 668 can correspond to the third prominent location 634.

The orientation module 508 can be partitioned between the first device 402 of FIG. 4 and the second device 406 of FIG. 4. For example, the orientation module 508 can be partition into the functional units of the first device 402, the second device 406, or a combination thereof. The orientation module 508 can also be implemented as additional functional units in the first device 102 of FIG. 3, the first device 402, the second device 406, or a combination thereof. The modules of the orientation module 508 can work individually and independently of other modules.

The navigation system 500 can be implemented with the first device 102. Each module of the navigation system 500 can be implemented using a combination of functional units of the first device 102. For example, the navigation system 500 can be implemented by running the software 312 of FIG. 3 on the control unit 308 of FIG. 3.

The user location module 502 can be implemented by the first device 102. The user location module 502 can be implemented with the user interface 302 of FIG. 3, the control unit 308, the software 312, the storage unit 304, the location unit 306, or a combination thereof.

For example, the control unit 308 can determine the origin location 206. The control unit 308 can run the software 312 to interface with the location unit 306 to determine the origin location 206. The control unit 308 can run the software 312 to interface with the storage unit 304 to store the origin information 522.

The route generation module 504 can be implemented with the first device 102. The route generation module can be implemented with the control unit 308, the software 312, the storage unit 304, or a combination thereof.

For example, the control unit 308 can identify the destination location 208 of FIG. 2. The control unit 308 can run the software 312 to interface with the storage unit 304, which can include the destination database 524, to identify the destination location 208. The control unit 308 can interface with the storage unit 304 to store the destination information 526.

The refinement request module 506 of FIG. 5 can be implemented with the first device 102. The refinement request module 506 can be implemented with the user interface 302, the control unit 308, the software 312, the storage unit 304, or a combination thereof.

For example, the control unit 308 can receive the orientation request 528. The control unit 308 can interface with the user interface 302 to receive the orientation request 528 from the user.

The orientation module 508 can be implemented with the first device 102. The orientation module 508 can be implemented with the user interface 302, the control unit 308, the software 312, the software 312, the storage unit 304, the location unit 306, or a combination thereof.

For example, the control unit 308 can identify the prominent locations 214 with the first device 102. The control unit 308 can run the software 312 to generate the search region 638 of FIG. 6. The control unit 308 can run the software 312 to interface with the storage unit 304, which can include the prominent location database 642, to identify the prominent locations 214. The control unit 308 can interface with the storage unit 304 to store the prominent location information 644.

The route modification module 510 can be implemented with the first device 102. The route modification module 510 can be implemented with the user interface 302, the control unit 308, the software 312, the storage unit 304, or a combination thereof.

For example, the control unit 308 can present the prominent locations 214 with the highest value of the prominence scores 536 as the orientation location 210. The control unit 308 can interface with the user interface 302, which can include the display interface 202, to present the orientation location 210.

The navigation system 500 can be implemented with the navigation system 400 of FIG. 4. Each module of the navigation system 400 can be implemented using a combination of functional modules of the first device 402 of FIG. 5 and the second device 406 of FIG. 4. For example, the navigation system 500 can be implemented by running the first software 426 of FIG. 4 on the first control unit 412 of FIG. 4 and the second software 442 of FIG. 4 on the second control unit 434 of FIG. 4.

The user location module 502 can be implemented with the first device 402, the second device 406, or a combination thereof. The user location module 502 can be implemented with the first user interface 418 of FIG. 4, the first control unit 412, the first software 426, the first storage unit 414, the location unit 420, or a combination thereof.

For example, the first control unit 412 can determine the origin location 206. The first control unit 412 can run the first software 426 to interface with the location unit 420 to determine the origin location 206. The first control unit 412 can run the first software 426 to interface with the first storage unit 414 to store the origin information 522.

The route generation module 504 can be implemented with the first device 402, the second device 406, or a combination thereof. The route generation module 504 can be implemented with the first control unit 412, the first software 426, the first storage unit 414, the first communication unit 416, the first device transmission 408, the second device transmission 410, the second communication unit 436, the second control unit 434, the second software 442, the second storage unit 446, or a combination thereof.

For example, the first control unit 412 can send the destination request 518 of FIG. 5 to the first communication unit 416. The first communication unit 416 can send the destination request 518 to the second communication unit 436 with the first device transmission 408. The second communication unit can send the destination request 518 to the second control unit 434.

As a further example, the second control unit 434 can identify the destination location 208 of FIG. 2 with the destination request 518. The second control unit 434 can run the second software 442 to interface with the second storage unit 446, which can include the destination database 524, to identify the destination location 208. The second control unit 434 can interface with the second software 442 to save the destination location 208 in the destination information 526 of FIG. 5.

In another example, the second control unit 434 can send the destination information 526 to the second communication unit 436. The second communication unit 436 can send the destination information 526 to the first communication unit 416 with the second device transmission 410. The first communication unit 416 can send the destination information 526 to the first control unit 412. The first control unit 412 can interface the with the first storage unit 414 to store the destination information 526.

The refinement request module 506 of FIG. 5 can be implemented with the first device 402, the second device, or a combination thereof. The refinement request module 506 can be implemented with the first user interface 418, the first control unit 412, the first software 426, the first storage unit 414, or a combination thereof.

For example, the first control unit 412 can receive the orientation request 528 of FIG. 5. The first control unit 412 can interface with the first user interface 418 to receive the orientation request 528 form the user.

The orientation module 508 can be implemented with the first device 402, the second device, or a combination thereof. The orientation module 508 can be implemented with the first control unit 412, the first software 426, the first storage unit 414, the first communication unit 416, the first device transmission 408, the second device transmission 410, the second communication unit 436, the second control unit 434, the second software 442, the second storage unit 446, or a combination thereof.

For example, the first control unit 412 can send the orientation request 528 to the first communication unit 416. The first communication unit 416 can send the orientation request 528 to the second communication unit 436 with the first device transmission 408. The second communication unit can send the orientation request 528 to the second control unit 434.

As a further example, the second control unit 434 can identify the prominent locations 214 of FIG. 2 with the orientation request 528. The second control unit 434 can run the second software 442 to initiate the search module 602 of FIG. 6. The second control unit 434 can run the second software 442 to interface with the second storage unit 446, which can include the prominent location database 642 of FIG. 6, to search for the first prominent location 630 of FIG. 6, the second prominent location 632 of FIG. 6, and the third prominent location 634 of FIG. 6. The second control unit 434 can interface with the second software 442 to save the first prominent location 630, the second prominent location 632, and the third prominent location 634 in the prominent locations 214.

In another example, the second control unit 434 can send the prominent locations 214 to the second communication unit 436. The second communication unit 436 can send the prominent locations 214 to the first communication unit 416 with the second device transmission 410. The first communication unit 416 can send the prominent locations 214 to the first control unit 412. The first control unit 412 can interface the with the first storage unit 414 to store the prominent locations 214.

The route modification module 510 can be implemented with the first device 402, the second device 406 or a combination thereof. The route modification module 510 can be implemented with the first user interface 418, the first control unit 412, the first software 426, the first storage unit 414, or a combination thereof.

For example, the first control unit 412 can present the prominent locations 214 with the highest value of the prominence scores 536 as the orientation location 210. The first control unit 412 can interface with the first user interface 418, which can include the display interface 202, to present the orientation location 210.

It has been discovered that the present invention provides a navigation system for orienting a user along a route. The navigation system can assist a user who is unfamiliar with a location by providing an orientation location between the origin location and the destination. The orientation location helps initially orient the user traveling from the origin to the destination. The orientation location is a prominent location within a search region around the user's origin location. The prominent location can be along the travel route and can help the user to navigate from the origin location to the prominent location then from the prominent location to the destination location.

The physical transformation of the orientation request 528 with the orientation module 508 to the prominent locations 214, the orientation location 210, and the orientation instruction 216 results in movement in the physical world, such as people using the first device 102 of FIG. 1, the first device 402 of FIG. 4, the navigation system 500, or vehicles, based on the operation of the navigation system 500. As the movement in the physical world occurs, the movement itself creates additional information that is converted back to the data for further processing with the orientation module 508, the prominent locations 214, the orientation location 210, and the orientation instruction 216 for the continued operation of the navigation system 500 and to continue the movement in the physical world.

Figure 7:
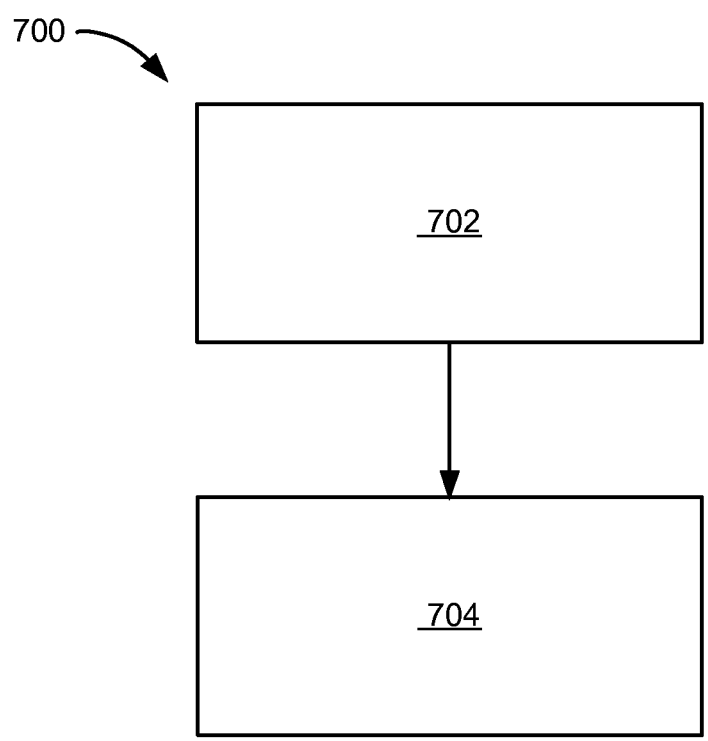
FIG. 7 is a flow chart of a method of operation of a navigation system with orientation mechanism in a further embodiment of the present invention.

Referring now to FIG. 7, therein is shown a flow chart of a method 700 of operation of a navigation system with orientation mechanism in a further embodiment of the present invention. The method 700 includes: calculating a travel route from an origin location to a destination location in a block 702; and identifying an orientation location along the travel route for assisting in an initial orientation from the origin location for displaying on a device in a block 704.

Yet another important aspect of the present invention is that it valuably supports and services the historical trend of reducing costs, simplifying systems, and increasing performance. These and other valuable aspects of the present invention consequently further the state of the technology to at least the next level.

Thus, it has been discovered that the navigation system of the present invention furnishes important and heretofore unknown and unavailable solutions, capabilities, and functional aspects for improving performance, increasing reliability, increasing safety and reducing cost of using a mobile client having location based services capability. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations can be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
    calculating a travel route from an origin location to a destination location;
    identifying an orientation location along the travel route for assisting in an initial orientation from the origin location for displaying on a device;
    selecting a prominent location along the travel route;
    modifying the orientation location with the prominent location as the orientation location, generating an orientation instruction from the origin location to the orientation location; and wherein:

selecting the prominent location includes selecting the prominent location based on a prominence score.

2. The method as claimed in claim 1 wherein identifying the orientation location includes selecting the prominent location recognizable from the travel route with the prominent location as the orientation location.

3. The method as claimed in claim 1 wherein identifying the orientation location includes selecting the prominent location along the travel route closest to the origin location with the prominent location as the orientation location.

4. The method as claimed in claim 1 identifying the orientation location includes:

generating an orientation instruction from the origin location to the orientation location; and displaying the orientation instruction on the device.

5. The method as claimed in claim 1 wherein identifying the orientation location includes:

generating a search region with the origin location within the search region; and searching for the prominent location within the search region with the prominent location as the orientation location.

6. A method of operation of a navigation system comprising:

calculating a travel route from an origin location to a destination location;

identifying an orientation location along the travel route for assisting in an initial orientation from the origin location;

selecting a prominent location that is recognizable from the travel route with the prominent location as the orientation location;

generating an orientation instruction from the origin location to the orientation location for displaying the orientation instruction on a device; and wherein:

selecting the prominent location includes selecting the prominent location based on a prominence score.

7. The method as claimed in claim 6 wherein selecting the prominent location includes selecting prominent locations having a first prominent location, a second prominent location, and a third prominent location.

8. The method as claimed in claim 6 wherein identifying the orientation location includes:

selecting prominent locations having a first prominent location, a second prominent location, and a third prominent location;

generating a search region, with the origin location within a search boundary; and searching for the first prominent location, the second prominent location, and the third prominent location within the search boundary.

9. The method as claimed in claim 6 wherein identifying the orientation location includes:

selecting prominent locations having a first prominent location, a second prominent location and a third prominent location;

ranking the first prominent location, the second prominent location and the third prominent location based on a prominence score; and displaying the orientation location as the prominent locations having the highest value of the prominence score.

10. A navigation system comprising:

a location unit for determining an origin location;

a route generation module, coupled to the location unit, for calculating a travel route from the origin location to a destination location;

an orientation module, coupled to the route generation module, for identifying an orientation location along the travel route for assisting in an initial orientation from the origin location for displaying on a device, the orientation module includes a search module for selecting a prominent location along the travel route;

a route modification module, coupled to the orientation module, for modifying the orientation location with the prominent location as the orientation location, the route modification module includes an instruction generation module for generating an orientation instruction from the origin location to the orientation location; and wherein:

the orientation module is for selecting the prominent location based on a prominence score; and the route modification module is for selecting the prominent location as the orientation location.

11. The system as claimed in claim 10:

the orientation module is for selecting the prominent location recognizable from the travel route.

12. The system as claimed in claim 10 wherein:

the orientation module is for selecting the prominent location along the travel route closest to the origin location.

13. The system as claimed in claim 10 wherein:

the route modification module is for generating an orientation instruction from the origin location to the orientation location; and further comprising:

a display interface, coupled to the route modification module, for displaying the orientation instruction on the device.

14. The system as claimed in claim 10 wherein:

the search module is for generating a search region with the origin location within the search region and for searching for a prominent location within the search region.

15. The system as claimed in claim 10 wherein the search module is for selecting the prominent location having a first prominent location, a second prominent location, and a third prominent location.

16. The system as claimed in claim 10 wherein the orientation module includes:

a location selection module for selecting the prominent location having a first prominent location, a second prominent location, and a third prominent location;

a region generation module for generating a search region, with the origin location within a search boundary; and a region search module for searching for the first prominent location, the second prominent location, and the third prominent location within the search boundary.

17. The system as claimed in claim 10 wherein the orientation module includes:

the search module for selecting the prominent location having a first prominent location, a second prominent location and a third prominent location;

a ranking module, coupled to the search module, for ranking the first prominent location, the second prominent location and the third prominent location based on a prominence score; and wherein:

the route modification module is for displaying the orientation location as the prominent location having the highest value of the prominence score.

* * * * *